(12) United States Patent
Binder et al.

(10) Patent No.: US 9,802,596 B2
(45) Date of Patent: Oct. 31, 2017

(54) METHOD FOR FURNISHING A SENSOR IN THE BRAKING SYSTEM IN A VEHICLE

(71) Applicant: Robert Bosch GmbH, Stuttgart (DE)

(72) Inventors: Helmut Binder, Neckarsulm (DE); Peter Sautter, Lauffen (DE); Wolfgang Peveling, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/860,376

(22) Filed: Sep. 21, 2015

(65) Prior Publication Data

US 2016/0114779 A1 Apr. 28, 2016

(30) Foreign Application Priority Data

Oct. 28, 2014 (DE) ........................ 10 2014 221 901

(51) Int. Cl.
| | |
|---|---|
| *B60T 7/12* | (2006.01) |
| *B60T 17/22* | (2006.01) |
| *B60T 8/171* | (2006.01) |
| *B60T 7/04* | (2006.01) |
| *B60T 13/14* | (2006.01) |
| *B60T 13/66* | (2006.01) |
| *B60T 13/68* | (2006.01) |
| *B60T 8/88* | (2006.01) |

(52) U.S. Cl.
CPC ............ *B60T 17/221* (2013.01); *B60T 7/042* (2013.01); *B60T 8/171* (2013.01); *B60T 8/885* (2013.01); *B60T 13/146* (2013.01); *B60T 13/662* (2013.01); *B60T 13/686* (2013.01); *B60T 2270/402* (2013.01); *B60T 2270/416* (2013.01)

(58) Field of Classification Search
CPC ........ B60T 17/221; B60T 7/042; B60T 8/171; B60T 13/146; B60T 13/662; B60T 13/686; B60T 2270/402; B60T 2270/416
USPC .............. 701/29.2, 70, 76; 303/113.4, 122.1, 303/122.11, 114.3, 122.02; 180/72.2
See application file for complete search history.

(56) References Cited

U.S. PATENT DOCUMENTS

| | | | | |
|---|---|---|---|---|
| 4,782,907 A | * | 11/1988 | Morishita | .............. B62D 7/148 180/412 |
| 4,789,938 A | * | 12/1988 | Maehata | ................... B60T 8/94 303/122.05 |
| 5,887,954 A | * | 3/1999 | Steiner | .................... B60T 7/042 303/113.4 |
| 6,749,271 B1 | * | 6/2004 | Mayr-Frohlich | .......... B60T 8/46 188/1.11 E |
| 2011/0168502 A1 | * | 7/2011 | Linhoff | ................. B60T 13/588 188/72.2 |
| 2013/0253756 A1 | * | 9/2013 | Matsuno | ............. B60W 30/182 701/29.2 |
| 2013/0253793 A1 | * | 9/2013 | Lee | ..................... B60W 50/029 701/70 |

* cited by examiner

*Primary Examiner* — Shardul Patel
(74) *Attorney, Agent, or Firm* — Norton Rose Fulbright US LLP

(57) ABSTRACT

A method for furnishing a sensor signal in a braking system, in which in the event of a failure of the brake control unit signal transfer is switched over and the signal is transmitted to a further control unit.

18 Claims, 2 Drawing Sheets

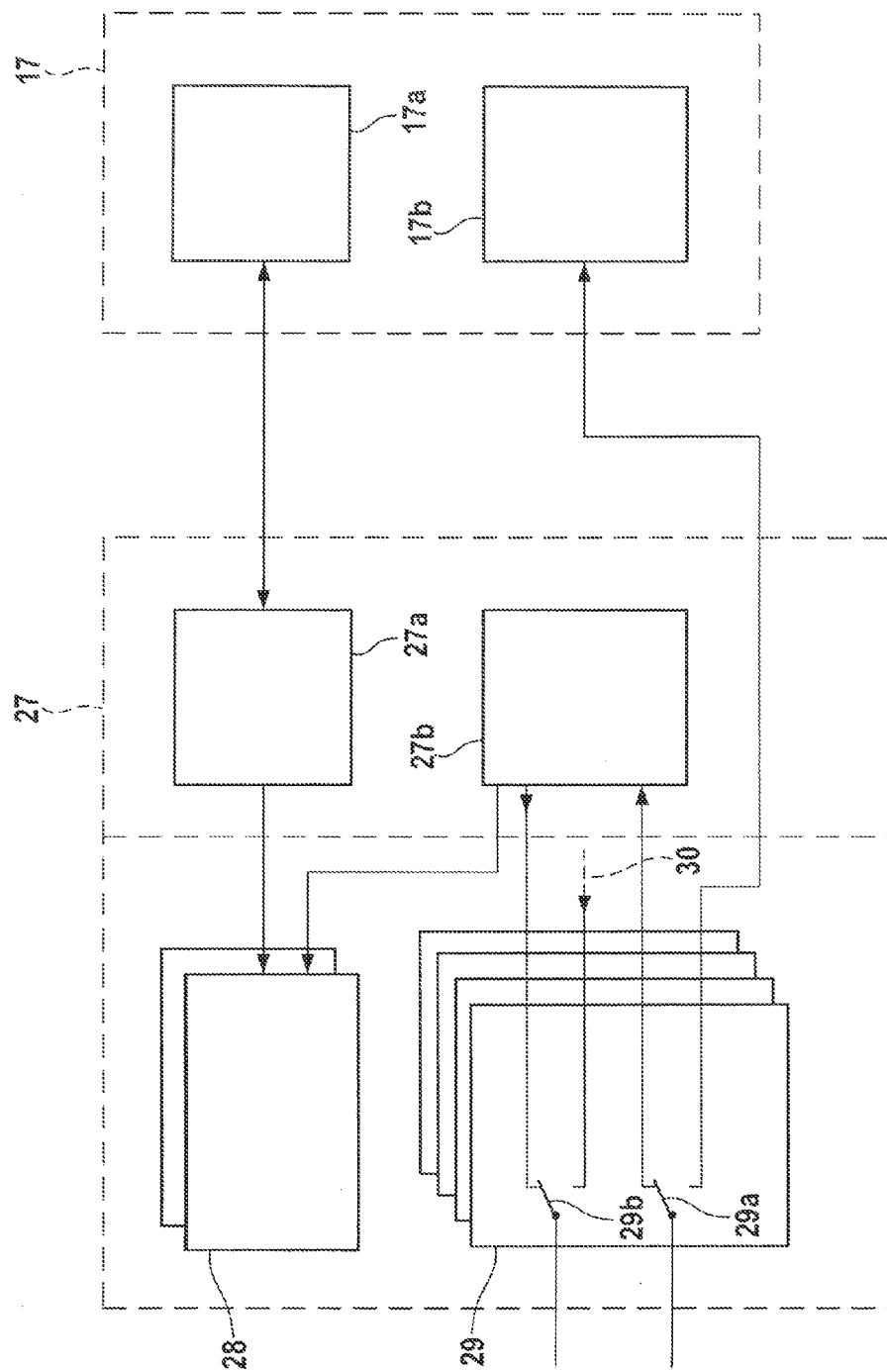

METHOD FOR FURNISHING A SENSOR IN THE BRAKING SYSTEM IN A VEHICLE

RELATED APPLICATION INFORMATION

The present application claims priority to and the benefit of German patent application no. 10 2014 221 901.9, which was filed in Germany on Oct. 28, 2014, the disclosure of which is incorporated herein by reference.

FIELD OF THE INVENTION

The present invention relates to a method for furnishing a sensor signal in the braking system in a vehicle.

BACKGROUND INFORMATION

Patent document DE 10 2009 046 339 A1 discusses a hydraulic braking system in a vehicle, which has two brake circuits for supplying hydraulic brake fluid to wheel brake devices, the brake circuits being connected to one shared brake master cylinder that is actuated by the driver, via a hydraulic brake booster, by way of the brake pedal. Located in each brake circuit is a delivery pump that is a constituent of an antilock braking system or electronic stability program by way of which an automatic intervention in the braking system can be carried out.

The antilock braking system or electronic stability program requires wheel rotation speed information that is ascertained by wheel rotation speed sensors, so that the brake pressure in the braking system can be manipulated as desired. In the event of a failure of the control unit of the antilock braking system or electronic stability program, the braking function by way of driver actuation is retained, but the automatic braking intervention that is required for autonomous driving is not guaranteed.

SUMMARY OF THE INVENTION

The object on which the invention is based is that of enhancing the fail-safe performance of braking systems in vehicles.

This object is achieved according to the present invention with the features described herein. The further descriptions herein describe useful refinements.

The method according to the present invention refers to a braking system in a vehicle, for example to a hydraulic braking system that is actuatable by the driver via the brake pedal and advantageously can also be actuated independently of driver actuation in the context of an automatic braking operation. For that purpose, the braking system advantageously has a controllable braking unit or booster unit to which control can be applied via positioning signals of a control unit, so that a braking operation can be carried out independently of a driver actuation. The braking unit or booster unit encompasses, for example, an electric positioning motor that influences, directly or via a linkage, the hydraulic brake pressure in the braking system.

According to an advantageous embodiment, the braking system has at least two mutually independently actuatable booster units by way of which the braking force generated in the braking system can respectively be influenced. Each booster unit advantageously has associated with it a control unit in which positioning signals for adjusting the booster unit can be generated on the basis of delivered input signals.

The method according to the present invention is based on the furnishing of a sensor signal in the braking system that has a brake control unit by way of which a booster unit in the vehicle is adjustable. In the event of a failure of the brake control unit, signal transfer is switched over to a further control unit to which the sensor signal is transmitted. The same procedure is carried out in the event of a faulty transmission of the sensor signal to the brake control unit.

This procedure has the advantage that a braking-relevant sensor signal is further processed even in the event that said signal does not arrive at, or cannot be processed in, the brake control unit. Because operation switches over to a second control unit, the braking-relevant information of the sensor signal is available in the braking system or optionally also outside the braking system. This makes it possible in particular to carry out an automatic braking operation even in the event of a failure of the brake control unit or in the event of a failure in transmission of the sensor signal to the brake control unit. The braking operation to be triggered and carried out manually remains unaffected thereby in all cases.

According to an exemplary embodiment, the sensor signal is a wheel rotation speed signal. Such signals are ascertained via wheel rotation speed sensors or probes, and in normal circumstances (when the braking system is functional) are transmitted as an input signal to the brake control unit, in which, in particular when a driver assistance system is activated, influence is exerted on, for example, the antilock braking system or electronic stability program. Such wheel rotation signals can, however, also be processed outside the brake system, for example for engine control or in order to apply control to a steering system having electrical servo assistance.

Alternatively to wheel rotation signals, other sensor signals that are relevant to a braking operation in the vehicle are also appropriate. These are, for example, vehicle status variables regarding longitudinal or transverse dynamics.

According to a further useful embodiment, the further control unit to which signal transfer is switched over in the event of a fault applies control to an electric motor used as a brake booster. Actuation thereof may be controlled via an electronic brake pedal, the motion of the electronic brake pedal being ascertained sensorially and the sensor signals being delivered as input signals to the control unit. The electric motor is then actuated and a brake cylinder is acted upon, optionally via a linkage, in order to establish the desired brake pressure in the braking system.

In conjunction with the brake control unit in the embodiment as a control unit of an electronic stability program (ESP) or antilock braking system (ABS), this creates the possibility of carrying out, in the event of a failure of the ESP control unit or ABS control unit, an autonomous or automatic braking operation at least in part, and optionally entirely, by way of the further control unit and the associated brake booster. The functional failure of the ESP control unit or ABS control unit can thus be partly, optionally entirely, compensated for by transferring functions to the further control unit and to the associated brake booster.

According to a further useful embodiment, control signals are generated in a microcontroller and/or an ASIC of the brake control unit and are evaluated in a switchover unit or in a switchover logic system associated with the switchover unit. The control signals generated in the microcontroller are, for example, signals that indicate the autonomous/non-autonomous driving mode, signals of a test mode for testing the switchover unit, or a trigger signal that is generated in the event of a fault in the ESP control unit or ABS control unit or a fault in a system component associated with that control unit, for example an electric pump motor or a pump unit.

According to a further useful embodiment, in the event of a fault the supply of voltage to the sensor, which in normal circumstances is handled by the voltage supply of the brake control unit, is switched over to an alternative power source. This is, in particular, the vehicle battery. Voltage supply to the sensor in the event of a fault is thereby ensured.

The braking system for carrying out the method encompasses at least one sensor for ascertaining a braking-relevant sensor signal that is present, for example, as a wheel rotation speed signal, as well as furthermore a brake control unit for applying control to a booster unit with which the braking force generated by the braking system can be influenced. The braking system is furthermore equipped with a switchover unit that enables a switchover and forwarding of the sensor signal to a further control unit in the event of a fault in the brake control unit or in the event of a faulty transmission of the sensor signal to the brake control unit. The braking system furthermore encompasses wheel brake units with which the wheels of the vehicle are decelerated.

In an advantageous embodiment, the switchover unit is coupled directly to the brake control unit and communicates therewith.

Further advantages and useful embodiments are evident from the further claims, from the description of the Figures, and from the drawings.

BRIEF DESCRIPTION OF THE DRAWINGS

FIG. 2 is a block diagram having an ESP control unit to which a switchover unit is coupled, and having a further control unit that is associated with an electrical brake booster.

DETAILED DESCRIPTION

Figure 1:
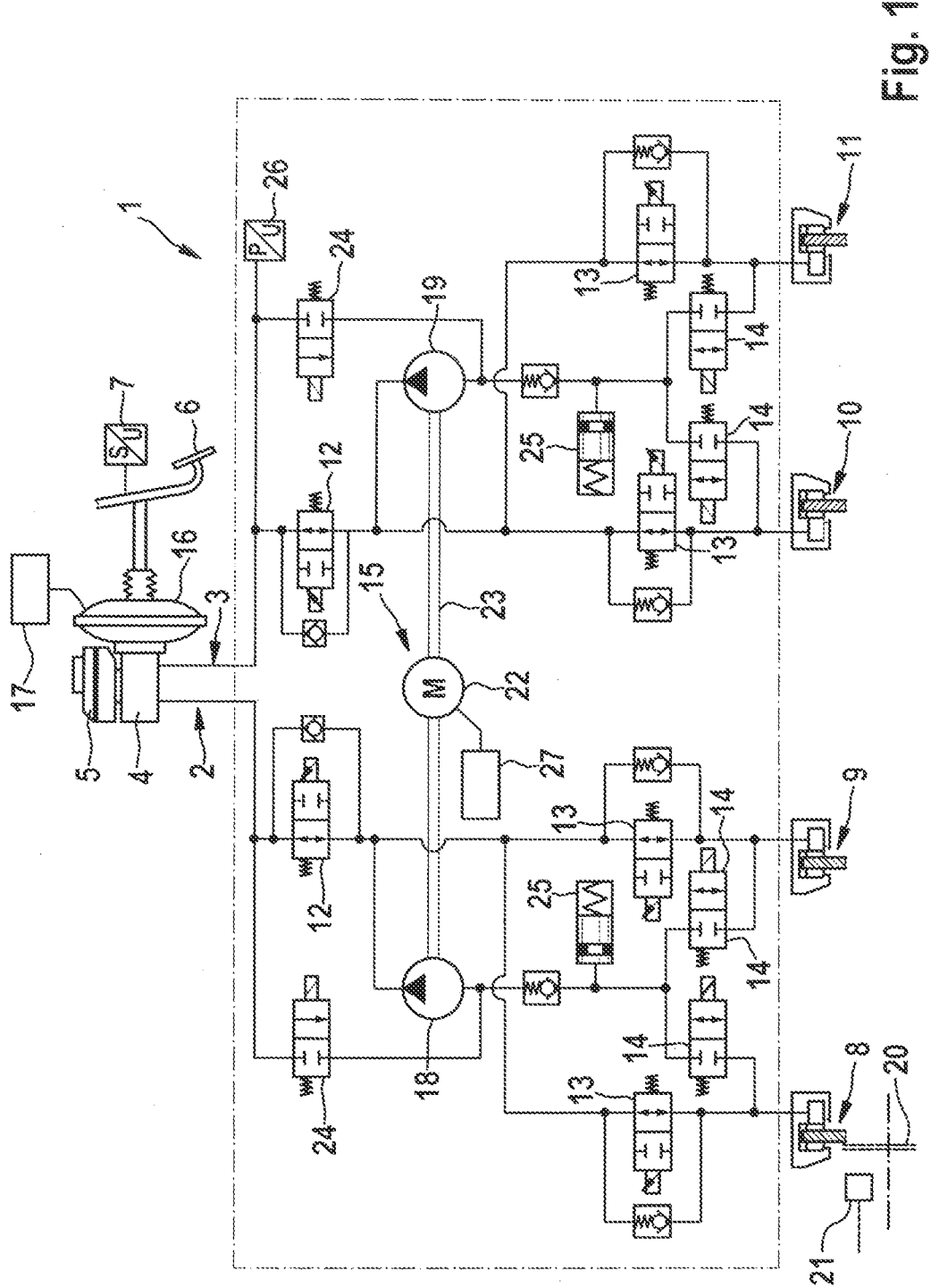
FIG. 1 is a hydraulic circuit diagram of a vehicle brake having two brake circuits associated with the front axle and the rear axle, and having an electronic stability program (ESP) and having an electrically actuatable brake booster.

Hydraulic braking system 1 depicted in the hydraulic circuit diagram according to FIG. 1 has a front-axle brake circuit 2 and a rear-axle brake circuit 3 for supplying hydraulic brake fluid respectively to wheel brake apparatuses 8 and 9 on the front wheels and 10 and 11 on the rear wheels. Also appropriate in principle are braking systems in which the brake circuit distribution is diagonal, so that a wheel brake apparatus is provided for each brake circuit on a front wheel and on a rear wheel.

The two brake circuits 2, 3 are connected to one shared brake master cylinder 4 that is supplied with brake fluid via a brake fluid reservoir 5. Brake master cylinder 4 is actuated by the driver via brake pedal 6, and the pedal travel exerted by the driver is measured via a pedal travel sensor 7. Located between brake pedal 6 and brake master cylinder 4 is a brake booster 16 that encompasses, for example, an electric motor may actuate brake master cylinder 4 via a linkage. The positioning motion of brake pedal 6 measured by pedal travel sensor 7 is transmitted as a sensor signal to a control unit 17 of brake booster 16, in which positioning signals for applying control to brake booster 16 are generated.

Disposed in each brake circuit 2, 3 is a switchover valve 12 that is located in the flow path between the brake master cylinder and the respective wheel apparatuses 8, 9 and 10, 11. Switchover valves 12 are open in their zero-current idle state. Each switchover valve 12 has associated with it a check valve, connected in parallel, through which flow can occur toward the respective wheel brake apparatuses.

Located between switchover valves 12 and the respective wheel brake apparatuses 8, 9 and 10, 11 are inlet valves 13 that are likewise open at zero current and have check valves associated with them through which flow can occur in the opposite direction, i.e. from the wheel brake apparatuses to the brake master cylinder.

Each wheel brake apparatus 8, 9 and 10, 11 has associated with it an outlet valve 14 that is closed at zero current. Outlet valves 14 are each connected to the suction side of a pump unit 15 that has a respective delivery pump 18, 19 in each brake circuit 2, 3. The pump unit has associated with it an electric drive motor or pump motor 22 that actuates both delivery pumps 18 and 19 via a shaft 23. The discharge side of the respective delivery pump 18, 19 is connected to a conduit segment between switchover valve 12 and the two inlet valves 13 for each brake circuit.

The suction sides of delivery pumps 18 and 19 are each connected to a high-pressure switching valve 24 that is hydraulically connected to brake master cylinder 4. In the context of a vehicle-dynamics control intervention, for rapid brake pressure buildup the high-pressure switching valves 24 that are closed in the zero-current state can be opened so that delivery pumps 18 and 19 draw hydraulic fluid directly out of brake master cylinder 4. This brake pressure buildup can be carried out independently of an actuation of the braking system by the driver. Pump unit 15, having the two delivery pumps 18 and 19, electric pump motor 22, and shaft 23, is part of a driver assistance system and is a component of an electronic stability program (ESP) or of an antilock braking system (ABS). Electric pump motor 22 is adjusted via positioning signals of a brake control unit or ESP control unit 27.

Located between outlet valves 14 and the suction side of delivery pumps 18 and 19, for each brake circuit 2, 3, is a reservoir chamber 25 that serves for temporary storage of brake fluid that is released through outlet valves 14 from wheel brake apparatuses 8, 9 and 10, 11 during a vehicle dynamics intervention. Associated with each reservoir chamber 25 is a check valve that opens in the direction of the suction sides of delivery pumps 18, 19. Reservoir chambers 25 are also part of the electronic stability program (ESP).

A pressure sensor 26 is disposed in brake circuit 3, adjacently to brake master cylinder 4, for pressure measurement.

Braking system 1 is furthermore equipped at each vehicle wheel 20 with a wheel rotation speed sensor 21 with which the respective wheel rotation speed can be ascertained. The sensor signal of wheel rotation sensor 21 is delivered as an input signal to ESP control unit 27, in which positioning signals for adjusting electric pump motor 22 are generated. Each vehicle wheel has associated with it a wheel rotation speed sensor whose sensor signals are conveyed to ESP control unit 27.

FIG. 2 is a block diagram depicting the interaction of control unit 17, which is associated with brake booster 16, and ESP control unit 27. Each control unit 17, 27 respectively encompasses a microcontroller 17a, 27a and an ASIC 17b, 27b. The block diagram describes the interaction of control units 17 and 27 in the event of a fault in ESP control unit 27, the consequence of which is that autonomous, automatic braking interventions can no longer be carried out via the ESP system. In order to allow autonomous braking interventions to continue to be carried out despite a failure of ESP control unit 27, in the event of a fault a functional displacement to control unit 17 of brake booster 16 occurs, whereupon the hydraulic brake pressure in the braking system is modulated via the electrically actuatable brake booster 16 so that single-channel ABS braking can be effected with a stabilized vehicle.

A switchover unit 29, preceded by a switchover logic system 28, is coupled to ESP control unit 27. Switchover logic system 28 controls switchover unit 29 with a control signal as a function of input variables that switchover logic system 28 receives from microcontroller 27a and from ASIC 27b of ESP control unit 27. The control signal generated by switchover logic system 28 in order to apply control to switchover logic system 29 contains, for example, the autonomous/non-autonomous driving mode, a test mode for testing switchover unit 29, or a trigger signal in the event of an electrical fault in the ESP system, in particular in ESP control unit 27.

Switchover unit 29 switches the switches 29a and 29b between two different switching states as a function of the control signal that is delivered. First switch 29a switches the rotation speed sensor signal from the rotation speed sensor either to ASIC 27b of the ESP control unit or alternatively to ASIC 17b of brake control unit 17 of brake booster 16. In the normal case (when all components are fully functional) switch 29a is set to convey the rotation speed sensor signal to ASIC 27b of ESP control unit 27 in order to allow an autonomous braking intervention to be carried out, as applicable, by the ESP system as a function of the delivered rotation speed sensor signals. In the presence of a fault that is detected in switchover logic system 28, however, switch 29a is reset so that the wheel rotation speed sensor signals are delivered to ASIC 17b of brake control unit 17. This makes it possible for the ESP functions performed in the context of an autonomous braking intervention to be carried out by brake control unit 17 and by the associated brake booster 16.

Second switch 29b in switchover unit 29 relates to the supply of electricity to wheel rotation speed sensors 21. In the normal case, electricity is supplied to wheel rotation speed sensors 21 via the electricity supplied to ASIC 27b of ESP control unit 27. In the event of a fault, switch 29b is reset and electricity is supplied, as indicated by dashed line 30, from a supply voltage obtained from the battery voltage of the vehicle battery.

As indicated by the dashed box, switchover logic system 28 and switchover unit 29 are coupled onto ESP control unit 27.

What is claimed is:

1. A method for providing a sensor signal in a braking system in a vehicle, the method comprising:
   ascertaining, via a sensor, at least one braking-relevant sensor signal; and
   performing, via a switchover unit, if there is a faulty transmission of the sensor signal to a brake control unit, or if there is a failure of the brake control unit, a switching over of the signal transmission, and transmitting the sensor signals to a further control unit, wherein the further control unit controls a brake booster that implements a braking function of each of a plurality of braking circuits of the braking system when the sensor signals are transmitted to the further control unit,
   wherein the switchover unit includes at least two switches, wherein one of the at least two switches enables transmission of the sensor signals to the brake control unit in a first switching state and enables transmission of the sensor signals to the further control unit in a second switching state different from the first switching state.

2. The method of claim 1, wherein the signal is a wheel rotation speed signal.

3. The method of claim 1, wherein the signal transmission is switched over, and the sensor signal is transmitted to the further control unit, exclusively if there is a failure of the brake control unit.

4. The method of claim 1, wherein the further control unit applies control to an electric motor with which the brake pressure in the hydraulic braking system is adjustable.

5. The method of claim 1, wherein the brake control unit is an ESP control unit or ABS control unit that applies control to an electric motor.

6. The method of claim 1, wherein control signals are generated in a microcontroller of the brake control unit and are evaluated in a switchover unit or in a switchover logic system associated with the switchover unit.

7. The method of claim 1, wherein if there is a fault the supply of voltage to the sensor of the brake control unit is switched over to an alternative power source via another of the at least two switches of the switchover unit.

8. The method of claim 1, wherein the brake control unit and the further control unit communicate with one another and exchange information regarding the fault state, regarding the autonomous/non-autonomous driving mode of the vehicle, or regarding vehicle state variables.

9. The method of claim 1, wherein if there is a fault the supply of voltage to the sensor of the brake control unit is switched over to an alternative power source, in particular to the vehicle battery, via another of the at least two switches of the switchover unit.

10. The method of claim 1, wherein all the braking circuits of the braking system are hydraulic braking circuits.

11. A braking system for a vehicle, comprising:
    at least one sensor for ascertaining a braking-relevant sensor signal;
    a brake control unit; and
    a switchover unit for switching over and forwarding the sensor signal to a further control unit if there is a fault in the brake control unit or if there is a faulty transmission of the sensor signal to the brake control unit, wherein the further control unit controls a brake booster that implements a braking function of each of a plurality of braking circuits of the braking system when the sensor signal is forwarded to the further control unit,
    wherein the switchover unit includes at least two switches, wherein one of the at least two switches enables transmission of the sensor signals to the brake control unit in a first switching state and enables transmission of the sensor signals to the further control unit in a second switching state different from the first switching state.

12. The braking system of claim 11, wherein the switchover unit is coupled directly to the brake control unit and communicates therewith.

13. The braking system of claim 12, wherein the switchover unit is coupled between the brake control unit and the further brake control unit.

14. The braking system of claim 13, wherein the switchover unit is disposed in a flow path between a brake master cylinder and the braking circuits.

15. The braking system of claim 11, wherein the brake control unit applies control to an electric pump motor.

16. The braking system of claim 11, wherein the further control unit applies control to an electric motor used as the brake booster.

17. The braking system of claim 16, wherein the brake booster is disposed between a brake actuation device and a brake master cylinder.

18. The braking system of claim 11, wherein all the braking circuits of the braking system are hydraulic braking circuits.

* * * * *